United States Patent Office 3,605,216
Patented Sept. 20, 1971

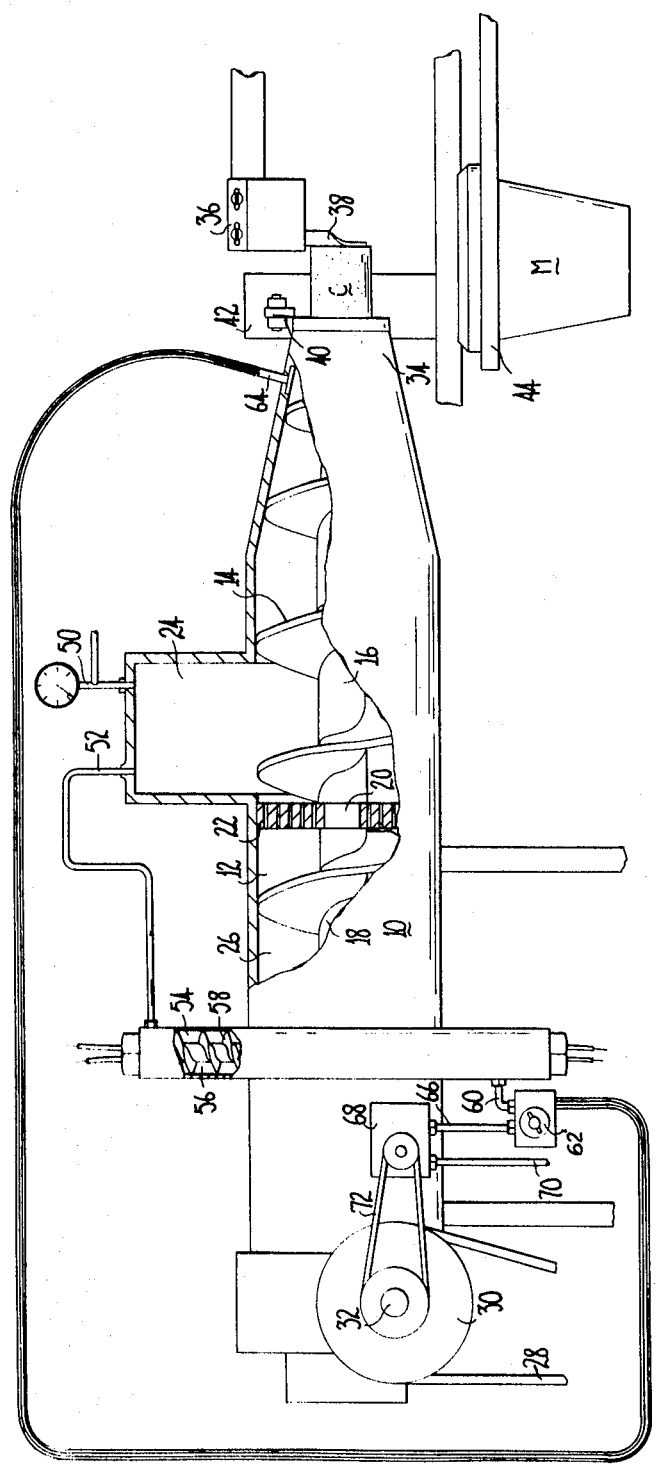

3,605,216
MANUFACTURE OF POTTERY WARE
Arthur Bradshaw, Stoke-on-Trent, England, assignor to Service (Engineers) Limited, Stoke-on-Trent, England
Filed Mar. 6, 1968, Ser. No. 710,985
Claims priority, application Great Britain, Mar. 14, 1967, 11,786/67
Int. Cl. B28b *3/22*
U.S. Cl. 25—14                      4 Claims

ABSTRACT OF THE DISCLOSURE

The invention relates to means and method for dispensing uniform pieces of clay from an intermittently operating extruding device to which superheated steam is introduced to raise the temperature of the clay. The quantity of clay extruded and cut-off to form each piece and the heat content of the steam introduced to the chamber can be varied independently, and temperature control means is provided to vary the heat content of the steam to compensate for variations in the temperature of the extruded clay.

The invention further relates to the incorporation of the extruding device in an automatic plant for the production of pottery articles, for example cups.

BACKGROUND OF THE INVENTION

Automatically operating machines are available for shaping pottery ware, and such machines have included means for automatically extruding and cutting off pieces of clay and allowing them to fall into or on to moulds. One such automatic plant is described in part in U.S. Letters Pat. No. 3,418,412, issued Dec. 24, 1968 in the names of F. W. Meadows and D. Podmore and U.S. Letters Pat. No. 3,435,493, issued Apr. 1, 1969 in the names of F. W. Meadows and A. Dowley. In this automatic plant, the extruding device operates intermittently, a feed screw in a chamber of the device being stopped when a measured quantity of clay has been extruded and the extruded piece of clay being cut-off when a mould is brought beneath it by conveyor means of the plant.

Whereas the aforementioned plant carries out its mechanical operations reliably in automatic sequence, it has been observed that sometimes a rather higher proportion than usual of cups have to be rejected because they are mis-shapen or cracked, resulting from faults in their structure which may become apparent only after drying or firing. At other times, difficulty has occurred due to pieces of clay deposited in the moulds spinning in the moulds under the action of a roller-type shaping tool rather than clinging to the mould and being properly shaped by the tools.

SUMMARY OF THE INVENTION

It is an object of the present invention to provide means and method for dispensing pieces of clay which are uniform from one piece to another and of uniform consistency within themselves and of controlled temperature throughout.

It is a further object of the invention to provide an intermittently operating extruding device for dispensing pieces of clay and which is provided with means for controlling the size and temperature of the pieces of clay dispensed.

With the above and other objects in view, as will hereinafter appear, the present invention in one aspect thereof contemplates the introduction of measured quantities of superheated steam to a de-airing chamber of an intermittently operating clay extruding device, the introduction of the steam taking place in time relation to operation of a feed screw which works intermittently upon the clay in the chamber.

According to another feature of the invention, superheated steam is supplied intermittently to a chamber of a clay-extruding device in quantities having controlled heat content, the device including a boiler maintained at a temperature above 100° C. and a pump which intermittently supplies small quantities of water to the boiler where the water is immediately converted into steam and led into the chamber, the heat content of the steam being controlled by varying the temperature of the boiler or the quantity of water supplied to it.

The above and other features of the invention, including various novel details of construction and combinations of parts, will now be more particularly described with reference to the accompanying drawing and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

The drawing is a view in side elevation and partly in section, with parts broken away, of an extruding device embodying the invention.

DESCRIPTION OF THE PREFERRED EMBODIMENT

Referring to the drawing, it will be seen that the illustrative device includes an extruding device comprising a housing 10 which provides a working chamber 12 in which a feed screw 14 is mounted for rotation about a horizontal axis. The feed screw 14 is a composite assembly of two blade portions 16, 18 mounted on a common shaft 20 and separated by a shredding plate 22 secured to the housing and dividing the chamber 12 into front and rear parts 24, 26 respectively.

Means including an electric motor (not shown) driving a belt 28 and pulley 30 on a shaft 32 and a worm wheel (not shown) at the rear of the housing 10 drives the feed screw 14. At its front end, the housing has a nozzle 34 which provides an extrusion orifice. An opening (not shown) in one side of the housing 10 (viz. behind the housing as viewed in the drawing) provides access to the rear portion 26 of the chamber 12, and a column of clay resting on a conveyor belt is constantly urged towards the chamber whereby to feed clay thereinto. The clay is worked by the feed screw as it progresses towards the nozzle, passing through the shredding plate 22 on its way.

The electric motor of the illustrative extruding device is switched on and off in response to actuation of a microswitch 36 having a depending yieldable actuating arm 38 in the path of the extruded clay. The microswitch is mounted for adjustment towards and away from the nozzle 34 to determine the length (and therefore the quantity) of a piece of clay C extruded from the orifice. The illustrative device also comprises a cutting blade 40 arranged to be actuated by a solenoid 42 actuated by means (not shown) responsive to the arrival of a mould M brought by conveyor means 44 into a charging position beneath the nozzle 34. The arrangement is such that upon arrival of a mould M in the charging position, the blade 40 is actuated to cut-off a piece of clay C, which drops into the mould, the microswitch 36 is actuated (by disengagement of the clay from the arm 38) to start the electric motor, whereupon the feed screw 14 rotates to extrude a further piece of clay, the motor being switched off and the screw stopped when the clay engages the arm 38 to operate the microswitch 36.

The housing 10 of the illustrative extruding device provides an upward extension of the front portion 24 of the chamber 12 into which lead two pipes 50, 52. The pipe 50 leads to a vacuum pump (not shown) whereby air is evacuated from the portion 24 of the chamber 12. The pipe 52 leads to the top of a vertical cylindrical boiler chamber 54 in which is an axially disposed metal column 56 which is provided with a spiral fin 58 which bridges the gap between the column and the wall of the chamber. Electrical heating elements (not shown) extend axially into the column from above and below and maintain the chamber 54 at a temperature above 100° C., for example 150° C. A cold-water pipe 60 leads from bottom of the chamber 54 to a control valve unit 62 of a type which can be set manually for a maximum desired flow of water and automatically regulated therebelow, for example by temporarily shutting off the flow altogether, by electrical means responsive to the temperature of the clay at the nozzle 34 as detected by a thermocouple device 64 mounted in the nozzle. The valve unit 62 is connected by a pipe 66 to a pump 68 supplied with mains water through a pipe 70 and driven by a belt 72 from the shaft 32.

In the operation of the illustrative device, when the electric motor drives the feed screw 14, a small quantity of water is pumped into the boiler chamber 54 where it is immediately converted into superheated steam and led under its own pressure into the "de-airing" portion 24 of the chamber 12. In the chamber 12 it condenses on the clay into which it is worked by the feed screw, the clay thus becoming uniformly heated. Excessive heating of the clay results in reduction in the quantity of water supplied to the boiler chamber as a result of automatic adjustment of the valve unit 62. (It will be realized that if preferred control of the heat content of the steam admitted to the chamber 12 could alternatively be achieved by arranging that the thermocouple device 64 controls the temperature of the heating elements in the column 56.) Because the feed screw 14 is driven intermittently to feed the individual pieces of clay C, controlled quantities of water are supplied intermittently to the boiler chamber 54 in time relation with the operation of the screw.

For example, in carrying out a method, illustrative of the invention, in which about 6 ounces of clay is cut off at each cycle of operation of the illustrative device at the rate of 20 pieces per minute, water is fed at the rate of from 6 to 10 pounds per hour in uniform amounts at each cycle. Thus, the moisture content of the clay is increased by 1–2%. The temperature of the heating elements is so maintained that the steam issuing from the top of the sleeve is superheated to about 130° C. The consequent rise in temperature of the clay is such that each piece cut off has been warmed uniformly to about 35° C. Using the illustrative device in carrying out the illustrative method, reliable and uniform production of cups at a high rate on the automatic plant hereinbefore referred to is readily maintained.

Having described the invention, what I claim as new and desire to secure by Letters Patent of the United States is:

1. A device for extruding pieces of clay comprising a chamber divided intermediate its ends by a shredding plate, a composite feed screw mounted for rotation in said chamber, said composite feed screw having two blade portions axially successive on a common shaft and separated by said shredding plate, a nozzle at one end of the chamber, an outlet from the chamber adjacent the nozzle for evacuating air from the chamber, an inlet to the chamber through which steam can be introduced downstream of said shredding plate, means for controlling the quantity of steam applied to the inlet, means for driving the feed screw, and means responsive to the quantity of clay extruded through the nozzle for cutting-off the extruded clay.

2. A device according to claim 1 wherein said means for controlling the quantity of steam is responsive to the temperature of the clay at the nozzle.

3. A device according to claim 2 wherein the means for controlling the quantity of steam comprise means for controlling the quantity of water admitted to a boiler chamber connected to the inlet to the chamber.

4. A device for the manufacture of pottery ware comprising means for bringing a succession of clay supports to a charging position, an extruding device at said charging position, said extruding device comprising a chamber divided intermediate its ends by a shredding plate and with an extrusion nozzle at one end, a composite feed screw comprising two axially successive blade portions separated by said shredding plate and rotatable in the chamber, means for driving the feed screw and stopping it after extrusion of a measured quantity of clay from the nozzle, means adjacent said nozzle for evacuating air from the chamber, means for admitting steam intermittently into the chamber in timed relation to operation of the feed screw, means responsive to the temperature of the clay at said extruding device to control the quantity of steam admitted to said chamber, means for varying the heat content of the steam admitted to the chamber, and means responsive to the presence of a clay support at the charging position for cutting-off a piece of clay extruded from the nozzle of the extruding device.

References Cited

UNITED STATES PATENTS

| | | | |
|---|---|---|---|
| 1,996,930 | 4/1935 | McClintock | 25—11 |
| 3,451,107 | 6/1969 | Cummings | 25—11 |
| 1,879,367 | 9/1932 | Lotz | 25—11 |
| 2,310,859 | 2/1943 | Miller | 25—11X |
| 2,340,673 | 2/1944 | Lotz et al. | 25—11X |
| 2,785,455 | 3/1957 | McElroy | 25—11 |

ANDREW R. JUHASZ, Primary Examiner.

L. GILDEN, Assistant Examiner.

U.S. Cl. X.R.

25—11